UNITED STATES PATENT OFFICE.

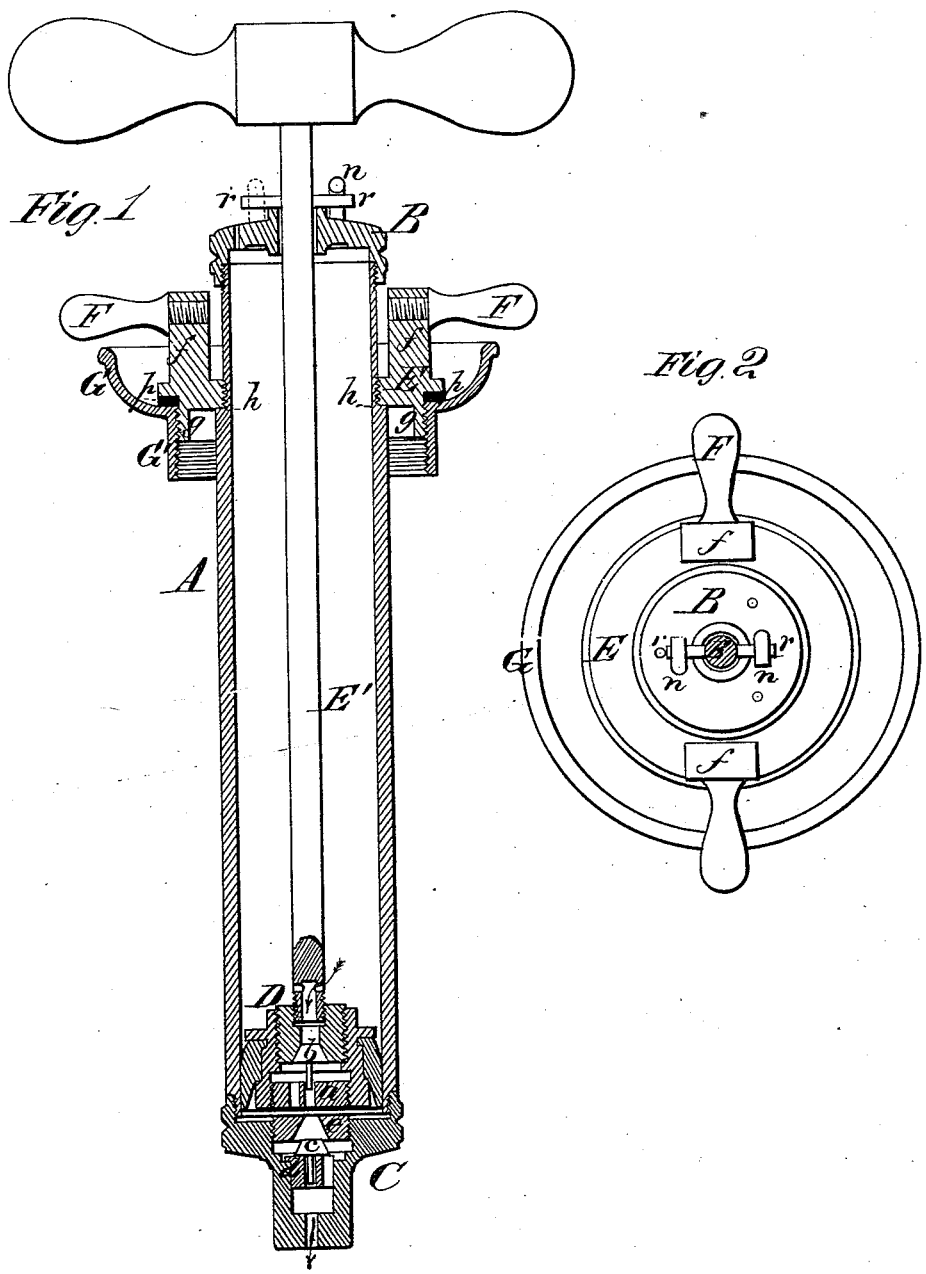

GEORGE E. BARKER, OF WAVERLY, NEW YORK.

IMPROVEMENT IN AIR-PUMPS.

Specification forming part of Letters Patent No. 162,264, dated April 20, 1875; application filed October 3, 1874.

*To all whom it may concern:*

Be it known that I, GEORGE E. BARKER, of Waverly, in the county of Tioga and State of New York, have invented a new and valuable Improvement in Air-Pumps; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a vertical central section of my air-pump; and Fig. 2 is a top view of the same.

This invention has relation to air-pumps which are especially designed for use in the fire-annihilator for which application for Letters Patent of the United States was made by me on the 31st day of January, A. D. 1874. The main object of my present invention is to provide for making a hermetically-sealed joint between the upper end of the air-pump barrel and the case of the annihilator. Another object of my invention is to provide a simple contrivance for holding down the piston and piston-rod of the pump when the same is not in use, as will be understood from the following description.

In the annexed drawings, A designates the barrel of the pump; B, the perforated removable cap thereof; C, the removable foot-piece, through which air is forced into the case of the annihilator; and D is the piston, which is packed in any suitable manner, and secured on the lower end of a rod, E′, carrying a T-shaped handle on its upper end. The foot-piece C contains a conical valve, c, which is guided by a perforated piece, d, and provided with a perforated valve-seat, e. (Shown in Fig. 1.) The piston B is provided with a valve, b, and a guide, a, for the stem of this valve, and at each downward stroke of the piston air will be forced into the case of the annihilator for the purpose of forcibly ejecting liquid therefrom. G designates a cup-shaped vessel having a cylindrical screw-threaded neck, G′, on its lower end. This vessel G is screwed upon the lower threaded portion g of a nut, E, and made tight by means of a packing-ring, p, confined between the cup and the nut. The nut E is furnished with two handles, F, fixed into elevated portions $f\ f$; and it is by means of these handles that the nut is forcibly screwed down on the annular shoulder h formed on the upper part of the pump-barrel A. When the cup or vessel G and the nut E are applied as described on the barrel A, a small quantity of any fluid will make the joints perfectly air-tight.

For the purpose of keeping the piston D down pins $r\ r$ are inserted through the rod E′ near the T-shaped handle of this rod, and hooks $n\ n$ are fixed into the cap B diametrically opposite each other, and turned in opposite directions. When the piston is fully depressed and rod E′ is given a slight turn pins $r\ r$ will pass below the hooks n, and hold down the piston.

What I claim as new, and desire to secure by Letters Patent, is—

1. In an air-pump for a fire-annihilator, the combination of nut E and cap G, packed as described, with the pump-barrel A, as specified.

2. The hooks $n\ n$ and pins $r\ r$, combined with the piston-rod E and the pump-barrel A, as described.

In testimony that I claim the above I have hereunto subscribed my name in the presence of two witnesses.

GEORGE E. BARKER.

Witnesses:
 L. D. STONE,
 MARY A. PEOPLES.